April 2, 1946.  L. L. LEACH  2,397,793
FUEL BURNER
Filed Oct. 11, 1944  4 Sheets-Sheet 2

INVENTOR
Lester L. Leach
BY
ATTORNEY

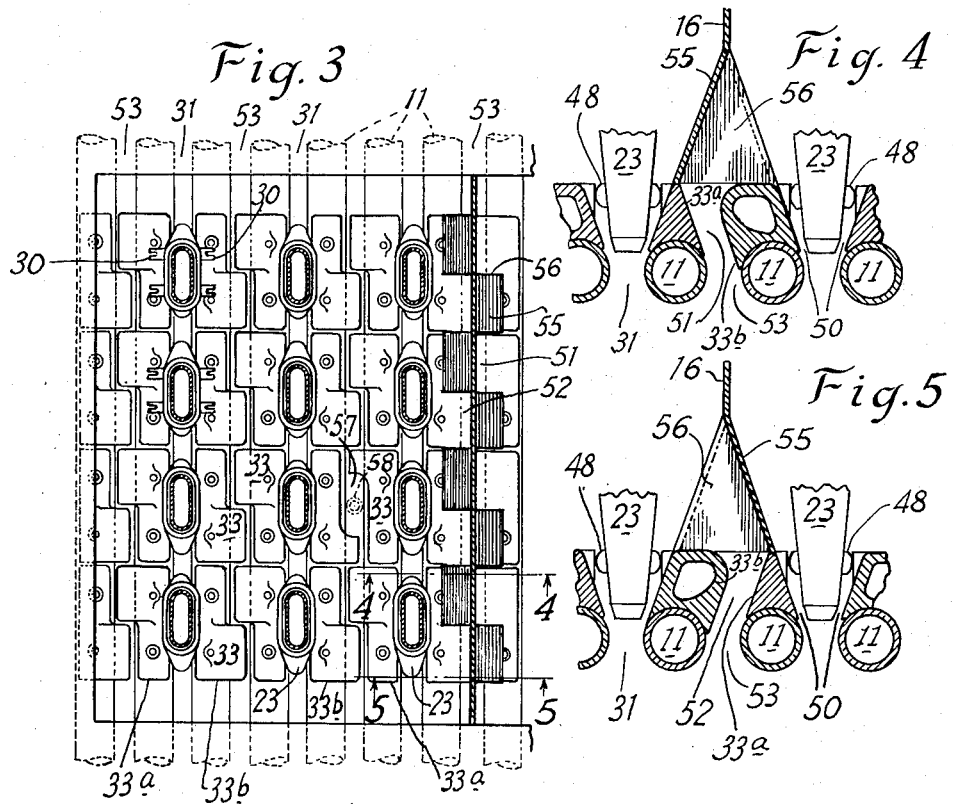
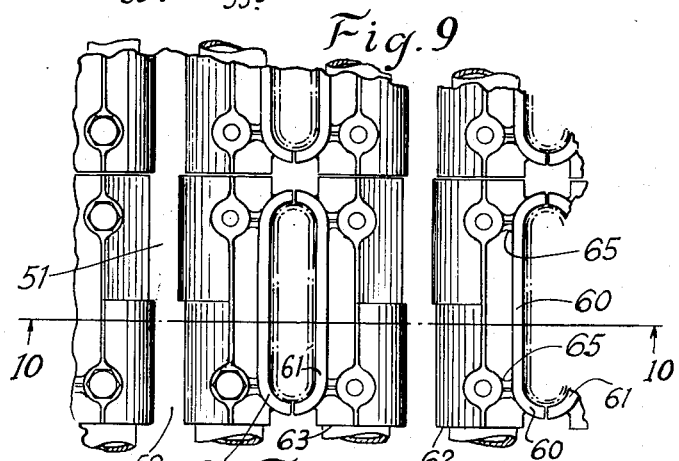
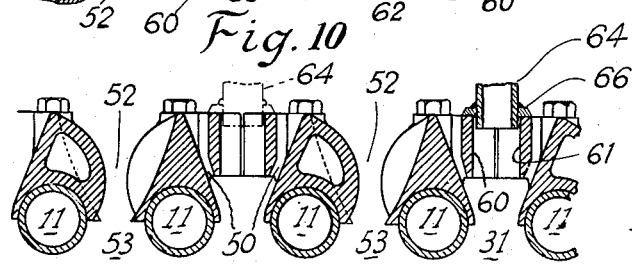

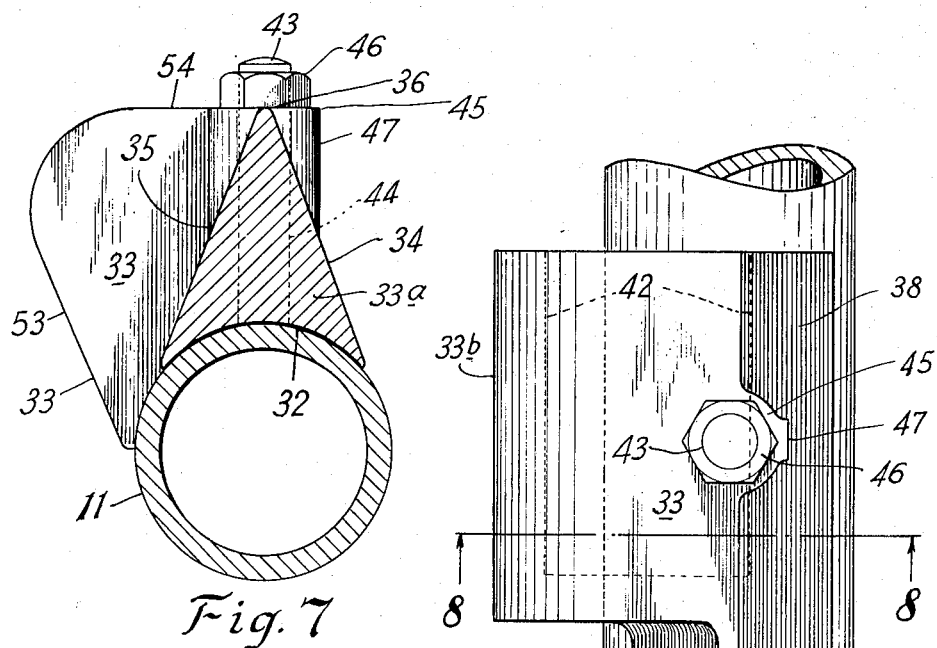
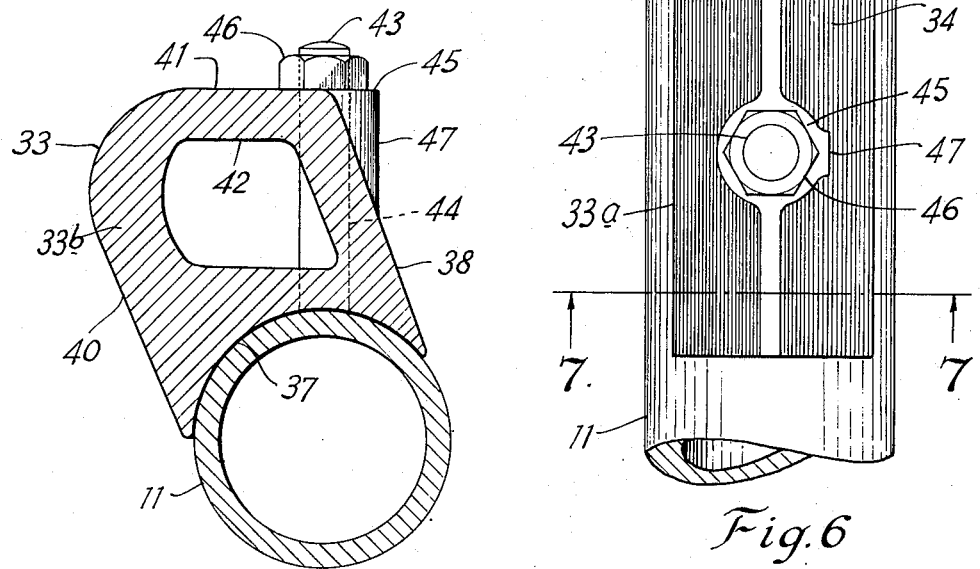

Patented Apr. 2, 1946

2,397,793

UNITED STATES PATENT OFFICE 2,397,793

FUEL BURNER

Lester L. Leach, Barberton, Ohio, assignor to The Babcock & Wilcox Company, Rockleigh, N. J., a corporation of New Jersey Application October 11, 1944, Serial No. 558,261

14 Claims. (Cl. 110—28)

The present invention relates to fuel burners adapted for use with fluid fuels in either the pulverized or gaseous state, and more particularly to multiple-tip pulverized fuel burners for furnaces having a plurality of spaced wall tubes extending across the burner port.

The general object of the present invention is to provide an improved multiple-tip fluid fuel burner for high capacity furnaces with such an intimate mixing of the fuel and the air for combustion as to produce short flame combustion conditions and a high rate of heat release in the furnace. A further object is the provision of a burner that is inexpensive to manufacture and simple to operate and maintain. A further object is to provide a burner construction which is simple in form and has a minimum number of separate parts. A further object is the provision of burner blocks adapted for mounting on the tubes of a burner port and so constructed that cooperating pairs of blocks form directional air passageways therebetween. A further and more specific object is the provision of an improved construction of a pulverized fuel burner in which the fuel and its carrier or primary combustion air is combined with a portion of the secondary combustion air before entering the furnace and the remainder of the secondary air is added to the fuel and air streams within the furnace. A further and more specific object is to provide a burner for pulverized fuel which will direct multiple streams of fuel between the spaced tubes of a furnace wall in an envelope of combustion air so that erosion of the tubes will be avoided and the streams of fuel will be intimately mixed with the proper amount of secondary air within the furnace for complete combustion.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described preferred embodiments of my invention.

Of the drawings:

Fig. 3 is a view of one burner port and part of an adjoining burner port taken on line 3—3 of Fig. 2;

Fig. 4 is an enlarged section taken on line 4—4 of Fig. 3;

Fig. 5 is an enlarged section taken on line 5—5 of Fig. 3;

Fig. 6 is an enlarged plan view of the individual burner block shown in Figs. 1 to 5;

Fig. 7 is a section of the block shown in Fig. 6 taken along the line 7—7;

Fig. 8 is a section of the block shown in Fig. 6 taken along the line 8—8;

Fig. 9 is a plan view of another embodiment of the burner blocks of my invention; and Fig. 10 is a vertical section taken on line 10—10 of Fig. 9.

Figure 1:
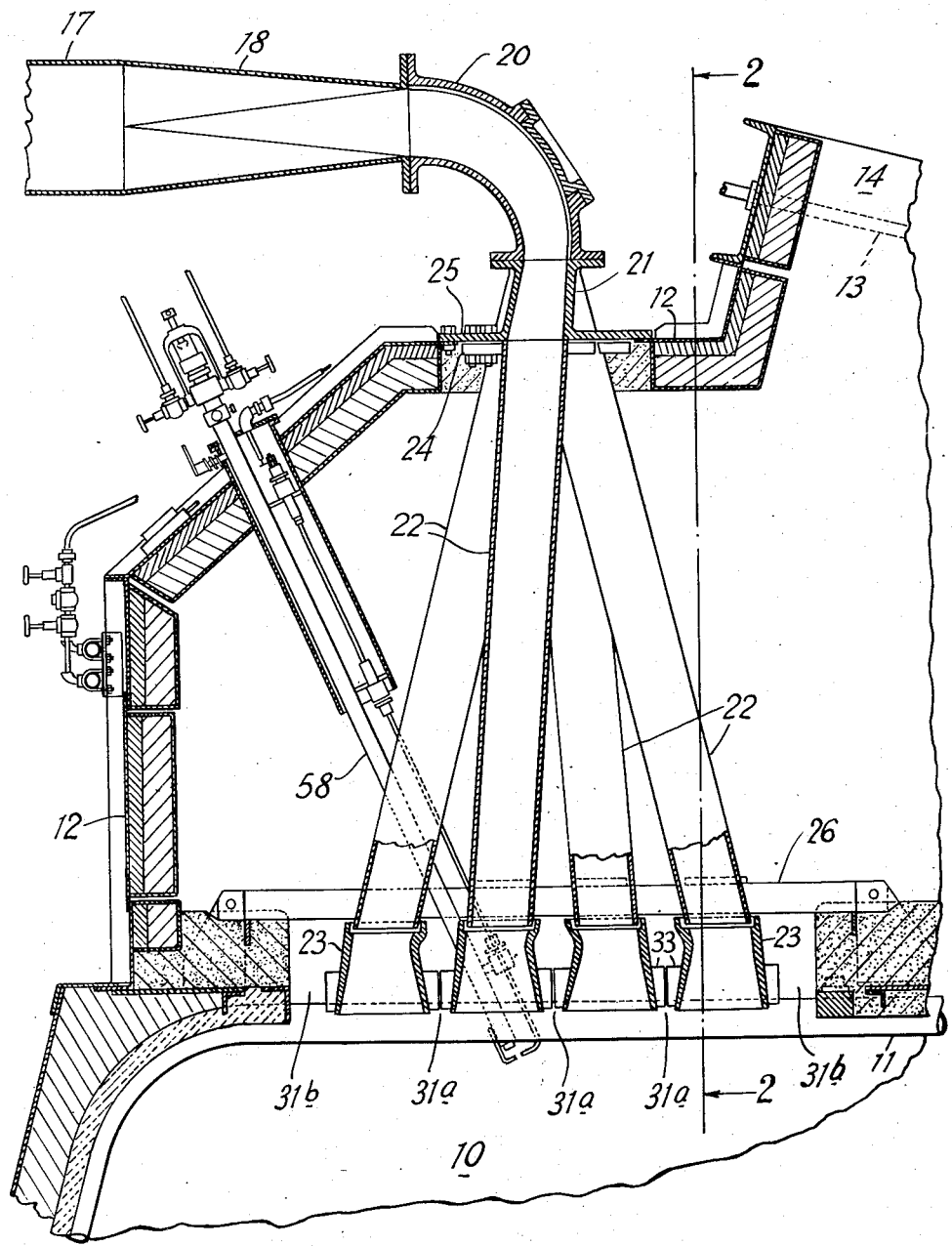
Fig. 1 is a sectional elevation of a pulverized fuel burner constructed in accordance with my invention.
Figure 2:
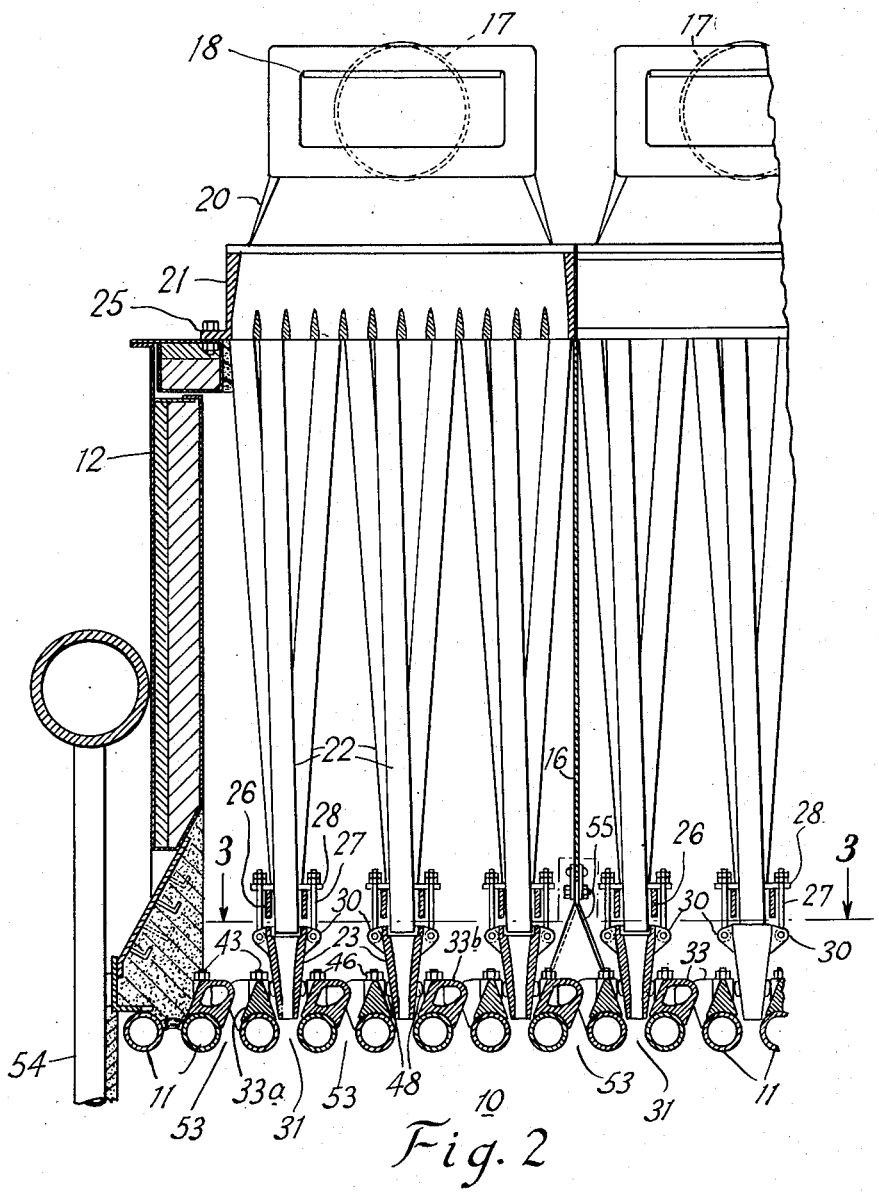
Fig. 2 is a view partly in section along the line 2—2 of the burner shown in Fig. 1, including one burner and part of an adjoining burner.

The fuel burner of the present invention is illustrated in Figs. 1, 2 and 3 as applied to a high capacity furnace 10 wherein the boundary walls are lined by spaced tubes 11 containing a cooling fluid, such as water. A rectangular burner port is provided in a horizontally inclined portion of the furnace roof with a similarly inclined row of transversely spaced tubes 11 extending thereacross. The burner port is enclosed by an insulated combustion air casing 12 which is connected to a suitable source of preheated air, the rate of air flow being regulated by a damper 13 in the connecting duct 14. When a plurality of contiguous burners are installed to serve the same furnace, uninsulated division walls 16 are installed to separate the air chambers of the individual burners. With such separate air chambers, the air flow to each burner can be individually regulated and the furnace 10 may be served by any desirable combination of fuel burners.

The fuel to be consumed in the furnace may be obtained from a convenient source, as for example an air swept pulverizer (not shown), through a conduit 17 and a transition piece 18 connected to the fuel burner. The transition piece 18 has a circular cross section adjacent the conduit 17 and has a rectangular section adjacent its connection to the burner which is elongated in a direction transversely of the burner port tubes 11. The portion of the burner outside the air casing 12 includes an elbow 20 wherein the fuel stream passing therethrough is directed vertically toward the burner port, and a riffle or splitter 21 wherein the fuel stream is divided into a plurality of substantially equal smaller streams. The fuel streams discharging from the splitter 21 are received by a corresponding plurality of burner nozzles 22 which deliver the fuel through nozzle tips 23 into the furnace 10. Each nozzle tip 23 is flared to form an opening elongated in a direction parallel to the tubes 11 and discharging a sheet of fuel between the transversely spaced tubes 11 of the burner port. A flange 24 on the burner nozzles 22 is attached to a matching flange 25 on the splitter 21 and the flanges are bolted together with the casing 12 secured thereon. The furnace ends of the nozzles 22 are positioned by pairs of bar members 26 which are attached to the burner framework. The nozzle tips 23 are replaceable and are attached to the nozzles 22 by bolts 27 between lugs 28 and 30 on each side of the assembly, where the bolts 27 are spaced from the outer walls of the nozzles 22 to provide an opening therebetween for the bar members 26.

In the embodiment of the invention illustrated by the drawings there are twelve nozzles 22 in each burner and they are arranged in three rows of four; each row is parallel to the axes of the tubes 11 and is transversely spaced from the adjacent row so that they will discharge through alternate intertube spaces 31. It will be understood the number of nozzles 22 in each row and/or the number of rows in each burner may be varied in accordance with design requirements.

Rows of metallic burner port blocks 33 are attached to the tubes 11 of the burner port to provide a series of directional passageways between the tubes for the flow of secondary air from the casing 12 into the furnace 10. As shown in Figs. 6, 7 and 8 each block 33 is formed to provide two distinct integral portions 33a and 33b, of equal axial length, wherein a cross-section of one, 33a, taken in a plane transverse of the block axis resembles an isosceles triangle having its recessed base 32 corresponding to the curvature of the supporting tube 11 and its sides 34 and 35 diverging from an apex 36 along planes substantially tangential to the outer surface of the tube 11. The sides of the triangular section terminate at positions spaced outwardly of the plane of the tube axes and the altitude of the triangular section is in a plane vertical to the plane of the tube axes. A cross-section of the other portion of the block, namely 33b, in a plane transverse of the block axis resembles a paralellogram having its recessed base 37 formed to correspond with the supporting tube 11 and having one side 38 forming a continuation of the plane of the side 34 of the triangular shaped portion of the block. The opposite generally parallel side 40 of the block section extends toward the furnace in a plane substantially tangential to the surface of the tube 11 and terminates in the plane of the tube axes. The side 40 joins the top 41 with a rounded corner. The top is parallel to the plane of the tube axes with its spacing above the tubes 11 equal to the altitude of the triangular section of the block whereby the plane of the top 41 is common to the apex 36. The parallelogram section of the block 33 is cored, as at 42, to reduce the mass of the metal and thus minimize strains in the block resulting from temperature changes encountered in furnace operation. Each block 33 is attached to its supporting tube 11 by a pair of stud bolts 43 which are welded to the tube and project through matching holes 44 formed at spaced positions in the block 33. A boss 45 surrounds each hole and provides a seat for a nut 46 which holds the block in position when secured to the corresponding bolt 43. One side of the boss 45 is flattened, as at 47, to provide a bearing surface for a spacing lug 48 on the nozzle tip 23. Rows of blocks on opposite sides of each row of nozzles are arranged with the triangular portion 33a of a block in one row in complementary relationship with the parallelogram portion 33b of the block in the laterally adjacent row. Blocks of adjacent rows are arranged in reversed end to end positions with the sides 34 and 38 of each row adjacent the row of nozzles in alternate tube spaces. Opposed block sides 34 and 38 positioned in spaced relationship on opposite sides of a row of nozzles define a secondary air passage 50 enclosing the nozzle tips 23, the tips 23 being centered in the passage 50 by the spacers 48 formed integral with the tip and bearing on the face 47 of the block bosses. With this construction streams of secondary air will flow down over the tube side walls and prevent impingement of air-borne pulverized fuel thereon and thus avoid erosion of the tube walls. The streams of secondary air and the air-borne pulverized fuel will mix in the intertube spaces due to the proximity of the streams and the flow velocities involved.

As previously described the blocks in adjacent parallel rows have their two portions in a complementary laterally spaced relationship with the sides 35 of the triangular portions 33a of the blocks in one row transversely paired with the sides 40 of the parallelogram portions 33b of the other row of blocks, thus defining a series of secondary air passages 51 and 52 which direct the air through the corresponding intertube space 53 in alternately opposite directions at an oblique angle to the plane of the tube axes. The fuel and primary air streams discharging with their enveloping streams of secondary air from the intertube spaces 31 are intersected by the secondary air streams discharging through the passages 51 and 52 at positions within the furnace 10 closely adjacent the nozzle tip outlets. Thus, each stream of pulverized fuel and air discharging into the furnace is impinged upon by intersecting streams of secondary air, one secondary air stream striking one portion of the fuel-air stream from one side, while a substantially equal secondary air stream strikes the remaining portion of the fuel-air stream from the other side. There will be some overlap of the two oppositely inclined secondary air streams impinging upon each stream of fuel and air, with the amount of the overlap depending particularly on the secondary air stream velocities discharging from the air passageways into the furnace.

Although, as shown in Fig. 1, the burner port areas 31a between the tips 23 in each row of nozzles, and the areas 31b between the end tips and the limits of the burner port, permit the unrestricted flow of secondary combusiton air, the openings 31a and 31b may however be reduced by the insertion of suitable filler pieces to increase the velocity of air flowing through the burner port air passages without increasing the quantity of total secondary air flow.

Approximately one half of the air discharging from the outermost intertube opening 53 of the burner port is directed toward the adjacent streams of fuel while the remaining air discharging therethrough is directed away from the fuel streams and toward a furnace side wall 54 to insure the presence of excess air in the vicinity of the furnace side wall tubes. Experience has shown that this excess air will assist in the prevention of tube wastage or corrosion, particularly in slag tap furnaces having a high heat release with accompanying high temperature.

The division wall 16 has extensions 55 which are alternately inclined to one side or the other so as to separate the secondary air entering the furnace 10 into a series of streams which specifically serve the corresponding nozzle tips in the separate burners. This is illustrated in Fig. 2 wherein a plurality of adjoining burners are used in the same furnace, and in Figs. 4 and 5, showing cross-section views of the wall 16 and the extensions 55 on a larger scale. The division wall 16 is located in a plane vertical to the port opening and is spaced equidistant between the axial center lines of two adjacent tubes, ending at a position exterior of the burner port. The partition extensions 55 are secured to the apex 36 of the triangular section 33a of each block 33 in both rows of blocks. The width of each extension 55 corresponds to the axial length of each triangular section 33a of the block 33. A vertical triangular plate 56 is welded to the ends of each extension 55 transversely across the intertube opening 53. Thus a series of air passages are formed wherein air passing from one burner casing 12 into the furnace 10 will be confined to the streams of fuel discharged by the rows of nozzle tips 23 in the same burner. This will permit operation of one burner while the adjoining burner is idle and the amount of air mixing with the fuel discharged by an individual burner will be controlled by each corresponding air valve in the duct 14.

As shown in Fig. 3, a pair of transversely adjacent blocks 33, as at 57, are partially cut away to provide an opening therebetween for the insertion of a retractable oil burning torch 58. The torch 58 projects through an intertube space 53 into the furnace 10 and is used to light the fuel delivered by the multi-tip burner. When steady combustion conditions are established in the furnace 10 with the pulverized fuel, the oil is turned off and the torch 58 is retracted into the air casing 12 until it is again required.

A modification of the burner port blocks of the present invention is shown in Figs. 9 and 10, wherein each longitudinal half 60 and 61 of a nozzle tip is formed as an integral part of each burner port block 62 and 63. Matching blocks 62 and 63 are secured to adjacent tubes 11 by the stud bolts 43 in the manner described in connection with Figs. 1–8 and the tip portions 60 and 61 of both blocks 62 and 63 provide a nozzle tip adapted to receive and support a corresponding burner nozzle 64. The tip portions 60 and 61 are integral with and spaced from the blocks 62 and 63 by connecting shoulders 65 near each end thereof, providing a passageway 50 for the flow of air between the tip portion 60 and the block 62, and between tip portion 61 and block 63. The nozzle 64 may be affixed to the tip portions 60 and 61 by welding a small curved bar to the perimeter of the nozzle and to the block as at 66. The advantage of the integral block and tip construction lies not only in a positive means for centering the discharging fuel between adjacent tubes of the intertube opening, but also in providing a support for the nozzles whereby the members 26, as shown in Fig. 1, will be omitted without sacrificing the strength or rigidity of the burner assembly. The blocks 62 and 63 are arranged in rows on the tubes of the burner port to provide passageways between alternate intertube openings for the flow of secondary combustion air into the furnace as previously described in connection with the embodiment shown by Figs. 1–8, wherein a portion of the secondary air forms an envelope around the stream of fuel discharging from each of the tips, and between intermediate intertube openings in a series of diverging streams intersecting the fuel and air streams discharging through the alternate intertube openings. The surface contours of the blocks 62 and 63 are rounded to streamline the air flow path therebetween for the air entering the intermediate intertube openings in a higher degree than the corresponding surface of the blocks 33 illustrated in Fig. 2 and to reduce the air flow resistance therethrough to a minimum.

It will be noted that the present invention provides a multiple-tip fluid fuel burner arranged to discharge streams of pulverized fuel between adjacent tubes across a furnace burner port. In addition rows of burner port blocks are provided to direct the flow of secondary air through the burner port into the furnace whereby a portion of that air envelops the streams of discharging fuel and primary air in a manner calculated to avoid abrasion of the wall tubes, thereby reducing burner maintenance. By introducing the remainder of the secondary air through directional air ports so that a portion of the air impinges on one part of the fuel and air streams from one side and a substantially equal portion of the air impinges on another part of the fuel and air stream from the other side, an effective mixing of the fuel and all of the air required for combustion is accomplished with a resultant complete and rapid combustion of the fuel within the furnace. Furthermore, since the fuel streams are discharged by the burner into regions of relatively low pressures a minimum of fan power is required to deliver pulverized fuel to the furnace. It will be further noted that all of the burner port blocks illustrated in Figs. 1–8 are constructed alike, with the single exception of a pair of blocks in each burner which are provided with an opening therethrough to accommodate a lighter torch. In the embodiment of the burner blocks illustrated by Figs. 9 and 10 they are constructed right and left hand to provide complementary portions of a nozzle tip.

I claim:

1. The combination with a furnace wall having a burner port therein and a plurality of wall tubes spaced across said port, of a fuel burner arranged to discharge through said port and comprising a plurality of fuel nozzles in spaced relationship between a pair of adjacent tubes, a combustion air supply casing enclosing said port, means for directing a portion of the air required for combustion from said casing between said nozzles and adjoining tubes, and means for directing another portion of said air from said casing through intertube spaces at opposite sides of said intertube space through which said nozzles discharge and in directions impinging on the fuel streams discharged from said nozzles.

2. The combination with a furnace wall having a burner port therein and a plurality of coplanar wall tubes spaced across said port, of a fuel burner arranged to discharge through said port and comprising a plurality of fuel nozzles in spaced relationship between a pair of adjacent tubes, a combustion air supply casing enclosing said port, means for directing a portion of the air required for combustion from said casing between said nozzles and adjoining tubes, and means for directing another portion of said air from said casing through intertube spaces at opposite sides of said intertube space through which said nozzles discharge and in staggered streams impinging on opposite sides of the fuel stream discharged from said nozzles.

3. The combination with a furnace wall having a burner port therein and a plurality of coplanar wall tubes spaced across said port, a combustion air casing enclosing said burner port, a fuel burner having a multiplicity of elongated fuel nozzles arranged in parallel rows and discharging multiple streams of fuel through alternate intertube spaces, and means for directing air from said casing around said fuel nozzles and also through the intermediate intertube spaces in directions impinging on said fuel and air streams.

4. The combination with a furnace wall having a burner port therein and a plurality of coplanar tubes spaced across said port, of a fuel burner arranged to discharge through said port and comprising rows of fuel nozzles arranged to discharge streams of fuel through alternate intertube spaces, a combustion air casing enclosing said burner port, means for directing a portion of the combustion air around each of said fuel nozzles in a direction generally parallel to the direction of fuel flow therefrom, and means for directing another portion of said combustion air through the intermediate intertube spaces in streams impinging on opposite sides and different portions of said air and fuel streams.

5. The combination with a furnace wall having a burner port therein, a plurality of coplanar wall tubes spaced across said port, and a combustion air casing enclosing said port, of a burner arranged to discharge pulverized fuel and primary combustion air through said port and comprising rows of elongated nozzle tips terminating at and arranged to discharge between alternate intertube spaces, and means for directing secondary combustion air through said burner port to mix with the fuel and air streams from said fuel nozzles comprising rows of burner port blocks mounted on said tubes, the burner blocks on the tubes adjacent said nozzle tips being arranged to form continuous ports therebetween and the burner blocks on the tubes intermediate said nozzle tips being arranged to form passages therebetween discharging through the intermediate intertube spaces in directions intersecting the fuel and air streams discharging from said nozzle tips.

6. The combination with a horizontally extending furnace wall having a burner port therein and a plurality of coplanar wall tubes spaced across said port, a combustion air casing enclosing said port, a burner arranged to discharge pulverized fuel and primary combustion air through said port and comprising rows of elongated nozzle tips terminating at and arranged to discharge through alternate intertube spaces and means for directing secondary combustion air through said burner port to mix with the fuel and air streams from said nozzle tips comprising rows of burner port blocks mounted on said tubes, the burner blocks on the tubes adjacent said nozzle tips being arranged to form continuous ports therebetween, the burner blocks on the tubes intermediate said nozzle tips being arranged to direct secondary air therebetween discharging through the intermediate intertube spaces in directions impinging the fuel and air streams discharging through said intertube spaces.

7. A burner for pulverized fuel comprising a row of elongated nozzle tips spaced across a furnace wall and arranged to provide a series of fuel streams discharging therefrom, means forming an air passage around each of said nozzle tips and arranged to provide an envelope of air about said fuel stream, and means forming a pair of air passages on each longitudinal side of said nozzle tip and arranged to direct one stream of air impinging on a portion of said fuel and air stream from one side thereof while another stream of air impinges on another portion of said fuel and air stream from the opposite side thereof.

8. A burner port block comprising longitudinally extending portions of different cross-sectional shape having external surfaces arranged to define inclined passages extending in diverging directions when positioned in spaced relation with a reversely arranged burner block of similar shape and cross section.

9. A burner port block adapted to be mounted on a burner port tube and comprising a pair of longitudinally extending portions of different cross-sectional shape having external surfaces arranged to define a pair of staggered inclined passages extending in diverging directions when positioned in spaced relation with a reversely arranged burner block of similar shape and cross section.

10. A burner port block adapted to be attached to a furnace wall tube in a burner port and comprising two equal longitudinal portions, the transverse cross section of one portion being generally of the shape of an isosceles triangle with the base thereof formed as a concave curve to embrace the supporting wall tube, the transverse cross section of the other portion of the block being generally of the shape of a parallelogram having one side formed as a concave curve embracing the supporting tube, one side being contiguous with the corresponding equal side of the triangular shaped block section, and its opposite side tangent to and merging into the surface of the supporting tube.

11. A plurality of contiguous pulverized fuel burners spaced across a furnace wall comprising a plurality of rows of spaced elongated tips discharging fuel and air therethrough, a combustion air casing enclosing said burners, a division plate in said air casing separating said burners, means for directing the flow of combustion air around said tips and enveloping each of said streams of fuel, means forming combustion air passages between said rows of elongated tips and arranged to direct alternate streams of said air transversely across the inside of said furnace wall and intersecting said streams of fuel, and a series of extensions attached to said division plate providing means directing flow of combustion air from each separate air casing intersecting the adjacent streams of fuel discharging from the tips in the same burner.

12. The combination with a furnace wall having a burner port therein and a plurality of wall tubes spaced across said port, of a fuel burner arranged to discharge through said port and comprising a plurality of fuel nozzles in spaced relationship between a pair of adjacent tubes, an air supply casing enclosing said port, means for directing the flow of air from said casing through the intertube space through which said fuel nozzles discharge and enveloping the fuel streams discharging therethrough, and means for directing air from said casing through intertube spaces at opposite sides of said intertube space through which said fuel nozzles discharge comprising rows of burner blocks mounted on said tubes and reversely arranged to form alternate air passages extending in directions impinging on the fuel streams discharged from said nozzles.

13. The method of burning pulverized fuel in suspension in a furnace which comprises discharging pulverized fuel and primary air into the furnace in a plurality of horizontally spaced transversely elongated streams, discharging a portion of the secondary air required for combustion into said furnace in an envelope around each of said fuel and air streams, and discharging another portion of said secondary air into said furnace in a multiplicity of staggered streams and in oppositely inclined directions so as to impinge alternately on opposite sides of said fuel and air streams.

14. The combination with a furnace having a boundary wall with a burner port therein and a side wall normal to said boundary wall adjacent said burner port, of a pulverized fuel burner comprising a plurality of rows of spaced elongated tips discharging pulverized fuel therethrough, a combustion air casing enclosing said burner, means for directing the flow of combustion air from said casing around said tips and enveloping each of said streams of fuel, and means forming combustion air passages between said rows of elongated tips and arranged to direct alternate streams of air from said air casing transversely across the inside of said boundary wall and intersecting said streams of fuel from opposite sides, said last named means including combustion air passages between the outside row of said tips and said side wall and arranged to direct a portion of the air passing therethrough across the adjacent furnace side wall.

LESTER L. LEACH.